3,329,734
PROCESS FOR THE PRODUCTION OF LOW MOLECULAR WEIGHT, LIQUID POLYBUTADIENES HAVING A PREDOMINATELY 1,4-CIS-STRUCTURE AND PRODUCT

Bernhard Schleimer and Heinrich Weber, Marl, Germany, assignors to Chemische Werke Huls Aktiengesellschaft, Marl, Germany, a corporation of Germany
No Drawing. Filed June 25, 1964, Ser. No. 378,047
2 Claims. (Cl. 260—680)

It is known that butadiene can be converted into a high molecular weight polybutadiene having a predominately 1,4-cis-structure under the influence of mixed catalysts consisting of alkylaluminum halides and compounds of metals of group VIII of the periodic system of Mendeleeff. It is also known to polymerize butadiene by means of the above mentioned catalysts in the presence of aliphatic or aromatic hydrocarbons or mixtures thereof and that the molecular weight of the polybutadiene formed can be varied by variation of the ratio of the aliphatic hydrocarbon to the aromatic hydrocarbon. Thus one may by the use of mixed catalysts of soluble nickel compounds and alkylaluminum halides produce relatively low molecular weight 1,4-cis-polybutadienes having molecular weights up to about 10,000. This molecular weight and particularly the viscosity of such polybutadienes are however too high for many purposes.

Finally it is known to polymerize butadiene to liquid, low molecular weight polymers having molecular weights up to about 500. Suitable catalysts for this purpose are the ether addition modified alkali metal; organic alkali metal compounds, e.g., lithiumbutyl; borofluoride or borofluoride-etherate and radical initiators.

The so-produced low molecular weight polybutadienes contain predominately either vinyl- or trans-double bonds. The cis-double bond content is less than 60%.

It has now been found that by the polymerization of butadiene with the assistance of mixed catalysts consisting of compounds of nickel and aluminumorganic compounds in the presence of diluents, low molecular weight, liquid polybutadienes containing more than 70% of cis- and less than 2% of vinyl double bonds and having molecular weights between 500 and 10,000 and viscosities between 50 and 3,000 centipoises (measured at 50° C. in a Hoepler falling ball viscosimeter according to Haake) can be obtained provided that the mixed catalyst used is a hydrocarbon soluble compound of nickel and alkylaluminum halide of the general formula

$$R_nAlX_{(3-n)}$$

in which R stands for an alkyl, alkylaryl or aryl group having from 1 to 12 carbon atoms, X stands for a halogen atom and $n$ is a whole number from 1 to 2. The halogen may be either chlorine, bromine or iodine. The most suitable alkylaluminum halides are the alkylaluminumsesquihalides and the dialkyl aluminum monohalides. Examples are the methyl-, ethyl-, propyl-, n-butyl-, isobutyl-, n-hexyl-, n-heptyl-, n-octyl, decyl-, dodecyl-, 2-alkylhexyl-, cyclohexyl-, cycloheptyl-, cyclooctyl-, cyclodecyl-, cyclododecyl and phenyl-aluminum-sesquichlorides, bromides and iodides.

Also suitable for use are mixtures of trialkyl-, triaryl- and trialkylaryl-aluminum compounds and dialkyl- and dialkylaryl-aluminum monohalides with alkyl and alkylaryl-aluminum-dihalides and aluminum trihalides provided that the average number of halogen atoms per aluminum atom and the number of alkyl-, aryl- or alkylaryl- groups is between 1 and 2.

Suitable nickel compounds for use in the process are compounds that are soluble in the aromatic or aliphatic hydrocarbon diluent used, e.g., nickel salts of organic acids such as nickel acetate, nickel butyrate, nickel stearate, nickel octoate and nickel naphthenate and complex compounds such as nickel diacetyl acetonate, nickel dibenzoyl acetonate and bis-cyclopentadienyl nickel.

The inorganic salts of nickel such as the halides are usable only when they are made soluble in the diluent used by means of primary, secondary or tertiary aliphatic or aromatic saturated or unsaturated alcohols such as butylalcohol, benzylalcohol, allylalcohol or furfurylalcohol or primary, secondary or tertiary amines such as butylamine, aniline, benzylamine or pyridine or ethers such as dialkylethers, diphenylethers, anisol, dioxane, tetrahydrofuran or furan etc.

Aliphatic, cycloaliphatic and aromatic hydrocarbons such as butane, pentane, hexane, cyclohexane, isopropylcyclohexane, gasoline fractions, benzene, toluene and the like are suitable as inert diluents. Also mixtures of these hydrocarbons as well as chlorinated hydrocarbons such as tetrachloroethylene and chlorobenzene can be used.

The inert diluent can be used in amounts within the range from 0.1 to 20, and advantageously within the range from 0.5 to 5 times the weight of the butadiene. As a rule the inert diluent is used within the range from equal to twice the amount of the butadiene.

In the mixed catalyst there should be from 0.01 to 0.5 and preferably from 0.25 to 0.3 molecule of the nickel compound for each molecule of the aluminum compound. The aluminum compound is used in amounts within the range from 0.0005 to 0.05 and preferably within the range from 0.001 to 0.01 mole per mole of butadiene-(1,3).

The polymerization is carried out suitably at low temperature such as from −30° C. to +50° C. Generally the polymerization is carried out within the range from 0° to 20° C. and at atmospheric pressure or at a small superatmospheric pressure up to 10 atmospheres. Generally the butadiene is introduced into the reaction chamber continuously in gaseous form but may be introduced intermittently in liquid form.

The adjustment of the molecular weight or the viscosity is effected mainly by variation of the Al:Ni ratio in the mixed catalyst. The average molecular weight of the polymer increases with increase in the Al:Ni ratio. The catalyst concentration, the polymerization temperature and the diluent also affect the molecular weight or viscosity. For instance diluent mixtures of aliphatic and aromatic hydrocarbons such as benzene-hexane mixtures result in lower average molecular weights or viscosities than pure hydrocarbons. Also the average molecular weight or viscosity of the reaction product is influenced by the purity of the butadiene used. If the butadiene-(1,3) contains acetylene or allene, e.g., butine-(1), butine-(2), propadiene and butadiene-(1,2), the average molecular weight of the polymer will decrease as the concentration of these compounds increases. These compounds can be added to the butadiene for regulating the molecular weight of the polymer if desired. Acetylenes that are not normally present in technical butadiene-(1,3) such as phenylacetylene or diacetylene may be introduced. Ketones, amines, esters and nitriles such as acetoacetic ester, acrylonitrile, acetonitrile and also alkyl halides and alkenyl halides such as vinyl chloride and allyl chloride also may be used as regulators. These regulator compounds may however be present in only small concentrations because otherwise they will inhibit the catalyst and result in poor yields.

The polymer is recovered from the reaction mixture and worked up in the well known manner i.e. the mixed catalyst is decomposed by means of water, alcohols, ketones or complex formers and the diluent is distilled or driven out with steam. Finally the catalyst resdue in the polymer can be removed by washing with water which may contain an inorganic or organic base or acid or which may be heated up to 80° C. or by washing with an alcohol such as methanol. As stated the reaction mixture can first be washed with water, then the organic diluent distilled in vacuum or driven off with steam. The liquid, low molecular weight polybutadiene is then freed of any lingering residue of diluent, alcohol or water by heating to a slightly elevated temperature under reduced pressure in a nitrogen atmosphere. Another procedure for recovering and working up the polymer consists in precipitating the polymer with an alcohol e.g. methanol and simultaneously stirring out the catalyst. The heavier polybutadiene is separated and freed of clinging alcohol by heating under vacuum up to about 100° C. A thin film evaporator is advantageous for the separation of the residual diluent, water and alcohol present in the polymer. The polymerization and the working up of the polymer as described above advantageously can be carried out in a continuous procedure.

The low molecular weight, liquid polybutadiene produced as described above, depending upon the reaction conditions employed, has an average molecular weight within the range from 500 to 10,000 and a viscosity within the range from 50 to 3,000 centipoises, measured at 50° C. in a Hoepler-falling ball viscosimeter according to Haake. Its content of cis-double bonds is more than 70%. The content of vinyl double bonds is not more than 2%. The remaining double bonds are trans double bonds. The content of cis-double bonds varies directly with the average molecular weight and viscosity, i.e., the lower is the molecular weight and viscosity the lower is the cis-double bond content. Increased polymerization temperature reduces the cis-double bond content of the product in spite of increasing molecular weight and viscosity.

The low molecular weight, liquid polybutadiene obtained by the above described process is suitable for many technical uses e.g. as a plasticizer for caoutchouc, for the production of hardenable films by cross-linking, as a coating and molding material and as a self drying oil or as an addition to other drying oils. The intermediate cis- and trans double bonds may be easily epoxidized, halogenated and hydrohalogenated and may be hydrogenated and give diene and ene-syntheses.

EXAMPLE 1

A 150 l. stirring vessel, washed free of oxygen with nitrogen, was charged with 54 l. of water-free benzene and 18 l. of water-free hexane and 184.3 g. (0.72 mol) of nickel (II) acetylacetonate dissolved in 5 l. of benzene and 352 g. (2.88 mol) of ethylaluminum sesquichloride were introduced successively at room temperature to form a mixed catalyst. Then, at a temperature of 5° C., 28.8 kg. (533 mol) of butadiene-1,3) was introduced in 1 kg. portions at intervals of 20 minutes over a period of 9.5 hours. The butadiene-(1,3) contained 0.16% by weight of butadiene-(1,2) as regulating compound. After 10 hours the catalyst was destroyed by the addition of 2 l. of methanol and the diluent (benzene-hexane) was expelled by steam distillation. The remaining liquid polybutadiene was stirred up four times with 50 l. of methanol and in each instance the mixture was permitted to stand and separate into an upper methanol phase and a lower liquid polybutadiene phase and the methanol phase was decanted off. The liquid polybutadiene was then freed of adhering methanol and traces of water in a film evaporator at 100° C./10 Torr. Thus there was produced 25 kg. (86.8% of theory) of a thinly liquid, water-clear polybutadiene having a viscosity of 88 centipoises at 50° C., a density (50° C./4° C.) of 0.8892 and an iodine number of 454. According to infrared analysis the liquid polymer contained 76% of cis-, 23% of trans- and <1% of vinyl double bonds.

EXAMPLE 2

The butadiene-(1,3) was polymerized in 72 l of water-free benzene without hexane but otherwise in the same manner as described in Example 1. 23 kg. (79.8% of theory) of a liquid, glass-clear polybutadiene having a viscosity of 140 centipoises/50° C. a density (50° C./4° C.) of 0.8909 and an iodine number of 467 was produced. According to infrared analysis the liquid polymer contained 78% of cis-, 21% of trans- and <1% of vinyl double bonds.

EXAMPLE 3

Butadiene which contained less than 0.01% by weight of butadiene-(1,2) was polymerized as described in Example 1. 24 kg. (83.3% of theory) of a liquid water-clear-polybutadiene having a viscosity of 192 centipoises/50° C., a density (50° C./4° C.) of 0.8892 and an iodine number of 447 was produced. According to infrared analysis the polymer contained 79% of cis-, 20% of trans- and <1% of vinyl double bonds.

EXAMPLE 4

Butadiene-(1,3) was polymerized at 20° C. but otherwise under the same conditions as in Example 1. 22 kg. (76.4% of theory) of a thinly liquid polybutadiene having a viscosity of 141 centipoises/50° C., a density (50° C./4° C.) of 0.8909 and an iodine number of 444 was produced. According to infrared analysis the polymer contained 70% of cis-, 29% of trans- and 1% of vinyl double bonds.

EXAMPLES 5–11

The data of Examples 5–11 given in the following Table 1 shows the influence of variation of the Al:Ni ratio in the catalyst upon the viscosity of the polymer, the polymerization being otherwise carried out under the conditions described in Example 1. The amount of nickel (II) acetylacetonate was varied as shown by Table 1 and the butadiene-1,3) contained 0.01% by weight of butadiene-1,2) as in Example 3.

TABLE 1

| Example | Al/Ni ratio | Ni-(II)-acetylacetonate mMol | Yield percent | Viscosity, cp./50° C. | Density, 50° C./4° C. | Iodine number | Double Bond Content in Percent | | |
|---|---|---|---|---|---|---|---|---|---|
| | | | | | | | cis- | trans- | vinyl- |
| 5 | 5:1 | 576 | 79 | 233 | 0.8933 | 458 | 78 | 21 | 1 |
| 6 | 7:1 | 411 | 72 | 314 | 0.8933 | 453 | 77 | 22 | 1 |
| 7 | 9:1 | 320 | 74 | 389 | 0.8933 | 453 | 79 | 20 | 1 |
| 8 | 15:1 | 192 | 78 | 440 | 0.8931 | 440 | 79 | 20 | 1 |
| 9 | 20:1 | 144 | 73 | 630 | 0.8928 | 456 | 81 | 18 | 1 |
| 10 | 25:1 | 115 | 76 | 1,260 | 0.8917 | 461 | 82 | 17 | 1 |
| 11 | 30:1 | 96 | 73 | 1,370 | 0.8900 | 468 | 85 | 14 | 1 |

EXAMPLE 12

40 mmol of ethylaluminum sesquichloride and 10 mmol of nickel (II) acetylacetonate were introduced at room temperature into a reaction vessel containing 1000 ml. of benzene under the exclusion of atmospheric oxygen and moisture by flushing with nitrogen. Then while maintaining a temperature of 0° C. 400 g. (7.4 mol) of Houdry-butadiene was introduced continuously within a period of 4–5 hours with continuous stirring. The Houdry butadiene had a purity of 98.5% by weight and contained 0.09% by weight of butadiene-(1,2), 0.16% by weight of allene, 0.81% by weight of butene-(1) and isobutene, 0.21% by weight of cis- and trans-butene and 0.17% by weight of butane. After 5 hours the polymerization was stopped by inactivation of the catalyst by the addition of 100 ml. of methanol and then the benzene and the added alcohol were distilled out under the vacuum of a water jet aspirator. The polymerization product was stirred up three times with 1000 ml. of methanol, the lighter methanol phase being removed each time by decantation. The resulting liquid polybutadiene was finally freed of adhering methanol and benzene under vacuum (10 Torr, 40° C.). 360 g. of a colorless, water-clear, thinly liquid polybutadiene was produced the intermediate double bonds of which were up to 90% in the cis and up to 8% in the trans position. The vinyl double bond content is 2%. The viscosity, measured in a falling ball viscometer of Hoepler at 50° C. was 340 centipoises. The iodine number was 455.

EXAMPLES 13–17

The following Table 2 shows dependence of the viscosity of the polybutadiene upon the composition of the benzene-pentane mixture used as diluent when the polymerization is carried out otherwise as described. Example 12 is included for comparison.

of acrylonitrile were introduced into a reaction vessel containing 1000 ml. of benzene at room temperature under the exclusion of atmospheric oxygen and moisture by flushing with nitrogen. 420 g. (8 mol) of butadiene was introduced continuously with stirring over a period of 5 hours while maintaining a temperature of 0° C. The purity of the butadiene was 99.5% by weight. It was free of butadiene-(1,2), butine-(1), butine-(2) and allene and contained as impurities 0.19% by weight of n-butane, 0.09% by weight of isobutane, 0.09% by weight of butene-(1) and traces of trans- and cis-butene, isobutane and propylene. After 6 hours the catalyst was destroyed by the addition of 100 ml. of methanol, the reaction product was precipitated by further methanol addition and the oily, heavier polybutadiene phase separated and stirred three times with 1 l. of methanol each time. The lighter methanol phase was decanted each time. The resulting liquid polybutadiene was finally freed of adhering methanol in vacuum (10 Torr, 40° C.). The result was 330 g. (78.5% of theory) of liquid polybutadiene whose intermediate double bonds are 91% of the cis- and 8% of the trans configuration. The vinyl double bond content was 1%. The viscosity measured in a Hoepler falling ball viscosimeter according to Haake at 50° C. was 1160 centipoises. The iodine number was 458 and the density (50° C./4° C.) was 0.8895.

TABLE 2

| Example | Benzene, ml. | Pentane, ml. | Yield, percent | Viscosity, cp./50° C. | Double bond content in percent | | |
|---|---|---|---|---|---|---|---|
| | | | | | cis- | trans- | vinyl- |
| 12 | 1,000 | | 90 | 340 | 90 | 8 | 2 |
| 13 | 850 | 150 | 74 | 240 | 84 | 15 | 1 |
| 14 | 750 | 250 | 70 | 240 | 85 | 14 | 1 |
| 15 | 600 | 400 | 75 | 160 | 85 | 14 | 1 |
| 16 | 500 | 500 | 83 | 135 | 84 | 15 | 1 |
| 17 | | 1,000 | 38 | 9,800 | 92 | 7 | 1 |

EXAMPLES 18–23

Table 3 below shows a series of polymerizations in different diluents, the conditions of the polymerization being otherwise as described in Example 12.

TABLE 3

| Example | Diluent, 1,000 ml. | Yield, percent | Viscosity, cp./50° C. | Double bond content in percent | | |
|---|---|---|---|---|---|---|
| | | | | cis- | trans- | vinyl- |
| 19 | Toluene | 78 | 130 | 78 | 21 | 1 |
| 20 | p-Xylene | 75 | 100 | 78 | 21 | 1 |
| 21 | Isopropylcyclohexane | 75 | 97 | 81 | 18 | 1 |
| 22 | Tetrachloroethylene | 46 | 110 | 78 | 17 | 5 |
| 23 | Chlorbenzene | 78 | 190 | 79 | 20 | 1 |

EXAMPLE 24

40 mmol of ethylaluminum sesquichloride, 10 mmol of nickel (II) acetyl-acetonate and 0.0053 g. (0.1 mmol)

EXAMPLES 25–32

The following Table 4 shows the viscosity of the liquid polybutadiene in relation to increasing amounts of acrylonitrile, the process being carried out otherwise as described in Example 24 with butadiene-(1,3) of the same purity. Example 24 is included in Table 4 for comparison.

TABLE 4

| Example | Acrylonitrile, mMol | Yield, percent | Viscosity, cp./50° C. | Density, 50° C./4° C. | Iodine number | Double Bond Content in Percent | | |
|---|---|---|---|---|---|---|---|---|
| | | | | | | cis- | trans- | vinyl |
| 24 | 0.1 | 78.5 | 1,160 | 0.8895 | 454 | 91 | 8 | 1 |
| 25 | 0.2 | 75 | 1,120 | 0.8894 | 457 | 90 | 9 | 1 |
| 26 | 0.5 | 75 | 570 | 0.8895 | 443 | 87 | 12 | 1 |
| 27 | 0.75 | 84.5 | 401 | 0.8890 | 448 | 86 | 13 | 1 |
| 28 | 1.0 | 69 | 369 | 0.8889 | 453 | 84 | 15 | 1 |
| 29 | 2.5 | 63.5 | 280 | 0.8892 | 442 | 85 | 13 | 2 |
| 30 | 5.0 | 45 | 675 | 0.8885 | 451 | 85 | 14 | 1 |
| 31 | 7.5 | 5 | | | | | | |
| 32 | 10 | | | | | | | |

EXAMPLE 33

80 mmol of diethylaluminum monochloride and 10 mmol of nickel (II) octoate were introduced at room temperature into a reaction vessel containing 760 ml. of benzene and 250 ml. pentane (both containing 10 p.p.m. of water) under the exclusion of atmospheric oxygen by flushing with nitrogen. 420 g. (8 mol) of butadiene-(1,3) was introduced continuously with stirring in 5 hours while maintaining a temperature of 0° C. The butadiene-(1,3) had a purity of 99.4% by weight and contained 0.15% by weight of butadiene-(1,2), 0.02% by weight of propadiene, 0.08% by weight of acetylacetylene, 0.01% by weight of trans- and 0.02% by weight of cis-butene, 0.01% by weight of butane, 0.32% by weight of 1- and isobutene and 0.03% by weight of propylene. After 6 hours the catalyst was destroyed by the addition of 100 ml. of methanol and the reaction mixture was worked up as in Example 24. 320 g. (74% of theory) of a liquid, water-clear polybutadiene was produced whose intermediate double bonds were 83% of the cis- and 15% of the transconfiguration. The vinyl double bond content was 2%.

The viscosity measured in a Hoepler falling ball viscosimeter according to Haake at 50° C. was 194, the iodine number was 454, the density (50° C./4° C.) was 0.8905 and the refractive index was ($n_D^{20}$) 0.5230.

We claim:

1. Process for the production of a low molecular weight, liquid polybutadiene containing more than 70% of cis and less than 2% of vinyl double bonds and having a molecular weight within the range from 500 to 10,000 and a viscosity within the range from 50 to 3,000 centipoises which comprises polymerizing butadiene in the presence of an inert diluent and a mixed catalyst consisting essentially of a nickel compound that is soluble in hydrocarbons and an alkylaluminum halide of the formula $$R_nAlX_{(3-n)}$$

in which R stands for a number selected from the group consisting of alkyl, aryl and alkylaryl groups containing from 1 to 12 carbon atoms, X is a halogen atom and $n$ is a whole number from 1 to 2, the molecular ratio of the aluminum organic compound to the nickel compound being within the range from 1:0.01 to 1 to 0.5 and the molecular ratio of butadiene to the aluminum organic compound being within the range from 1:0.0005 to 1:0.05.

2. Process as defined in claim 1 in which the inert diluent is a mixture of aliphatic and aromatic hydrocarbons.

References Cited

UNITED STATES PATENTS 3,203,945    8/1965    Zelinski _____ 260—94.3

DELBERT E. GANTZ, *Primary Examiner.*

G. E. SCHMITKONS, *Examiner.*